United States Patent
Funayama et al.

(10) Patent No.: US 10,845,814 B2
(45) Date of Patent: Nov. 24, 2020

(54) HOST VEHICLE POSITION CONFIDENCE DEGREE CALCULATION DEVICE

(71) Applicant: TOYOTA JIDOSHA KABUSHIKI KAISHA, Toyota-shi, Aichi (JP)

(72) Inventors: Ryuji Funayama, Yokohama (JP); Toshiki Kindo, Yokohama (JP); Ayako Shimizu, Numazu (JP); Sho Otaki, Yokohama (JP); Hojung Jung, Susono (JP); Takayuki Iwamoto, Sunto-gun (JP); Yasuo Sakaguchi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 193 days.

(21) Appl. No.: 16/041,971

(22) Filed: Jul. 23, 2018

(65) Prior Publication Data
US 2019/0064830 A1    Feb. 28, 2019

(30) Foreign Application Priority Data
Aug. 25, 2017  (JP) ................. 2017-162479

(51) Int. Cl.
*G05D 1/02* (2020.01)
*G01S 5/16* (2006.01)
(Continued)

(52) U.S. Cl.
CPC ....... *G05D 1/0214* (2013.01); *B60W 50/0098* (2013.01); *G01C 21/30* (2013.01);
(Continued)

(58) Field of Classification Search
CPC .. G05D 1/0214; G05D 1/0238; G05D 1/0274; G05D 1/0088; G05D 2201/0213;
(Continued)

(56) References Cited

U.S. PATENT DOCUMENTS

| 8,589,014 | B2 | 11/2013 | Fairfield et al. |
| 8,620,025 | B2 * | 12/2013 | Higuchi ................. G08G 1/165 |
| | | | 382/103 |

(Continued)

FOREIGN PATENT DOCUMENTS

| JP | 2007-206010 A | 8/2007 |
| JP | 2008-164384 A | 7/2008 |

(Continued)

OTHER PUBLICATIONS

Machine Translation of JP 2013-025401A, retrieved from Espacenet on Mar. 28, 2020 (Year: 2020).*

*Primary Examiner* — Thomas Ingram
(74) *Attorney, Agent, or Firm* — Sughrue Mion, PLLC

(57) ABSTRACT

A device includes: a reference confidence degree calculation unit configured to calculate a reference confidence degree in estimating the position of the host vehicle at a candidate passing position of the host vehicle set in advance based on the position information on the object on the map; a shield information acquisition unit configured to acquire shield information based on a result of detection; a shielding influence degree calculation unit configured to calculate a shielding influence degree in estimating the position of the host vehicle at the candidate passing position based on the shield information; and a confidence degree calculation unit configured to calculate a confidence degree in estimating the position of the host vehicle at the candidate passing position based on the reference confidence degree and the shielding influence degree.

14 Claims, 9 Drawing Sheets

(51) Int. Cl.
  *G01C 21/30* (2006.01)
  *B60W 50/00* (2006.01)
  *G01C 21/34* (2006.01)
  *G01C 21/36* (2006.01)
  *G05D 1/00* (2006.01)
  *G06K 9/00* (2006.01)

(52) U.S. Cl.
  CPC ....... *G01C 21/3461* (2013.01); *G01C 21/367* (2013.01); *G01S 5/16* (2013.01); *G05D 1/0088* (2013.01); *G05D 1/0238* (2013.01); *G05D 1/0274* (2013.01); *G05D 2201/0213* (2013.01); *G06K 9/00791* (2013.01)

(58) Field of Classification Search
  CPC ........ G01S 5/16; G01S 13/931; G01S 17/931; G01C 21/30; G01C 21/3461; G01C 21/367; B60W 50/0098
  See application file for complete search history.

(56) References Cited

U.S. PATENT DOCUMENTS

| | | | |
|---|---|---|---|
| 2007/0257837 | A1 | 11/2007 | Watanabe et al. |
| 2010/0004856 | A1* | 1/2010 | Kobori ............. G01S 19/48 701/532 |
| 2013/0261872 | A1 | 10/2013 | Ferguson et al. |
| 2015/0378015 | A1* | 12/2015 | You ................. G01S 13/06 701/469 |
| 2016/0259335 | A1 | 9/2016 | Oyama |
| 2017/0329328 | A1 | 11/2017 | Horita et al. |
| 2018/0239032 | A1* | 8/2018 | Thiel ................ G01C 21/30 |
| 2018/0246907 | A1* | 8/2018 | Thiel ................ G01C 21/32 |

FOREIGN PATENT DOCUMENTS

| | | |
|---|---|---|
| JP | 2010-107435 A | 5/2010 |
| JP | 2013025401 A | 2/2013 |
| JP | 2015-516623 A | 6/2015 |
| JP | 2016-030513 A | 3/2016 |
| JP | 2016-130971 A | 7/2016 |
| JP | 2016-162299 A | 9/2016 |
| JP | 2017-072423 A | 4/2017 |

* cited by examiner

Fig.2
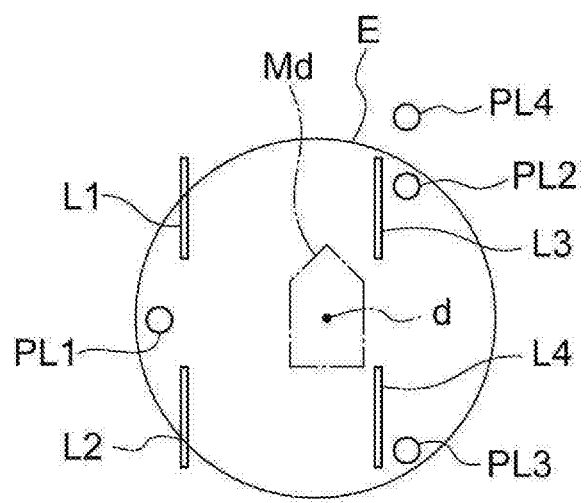
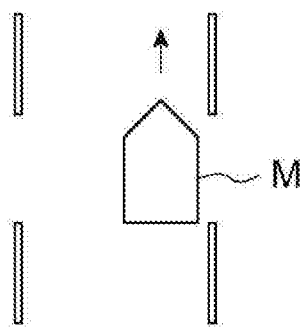

Fig.4
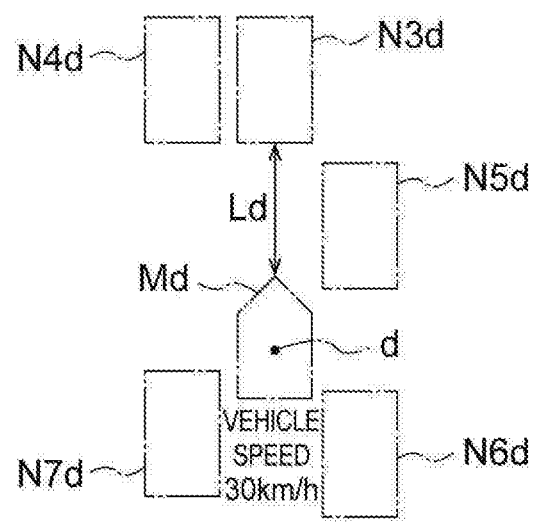
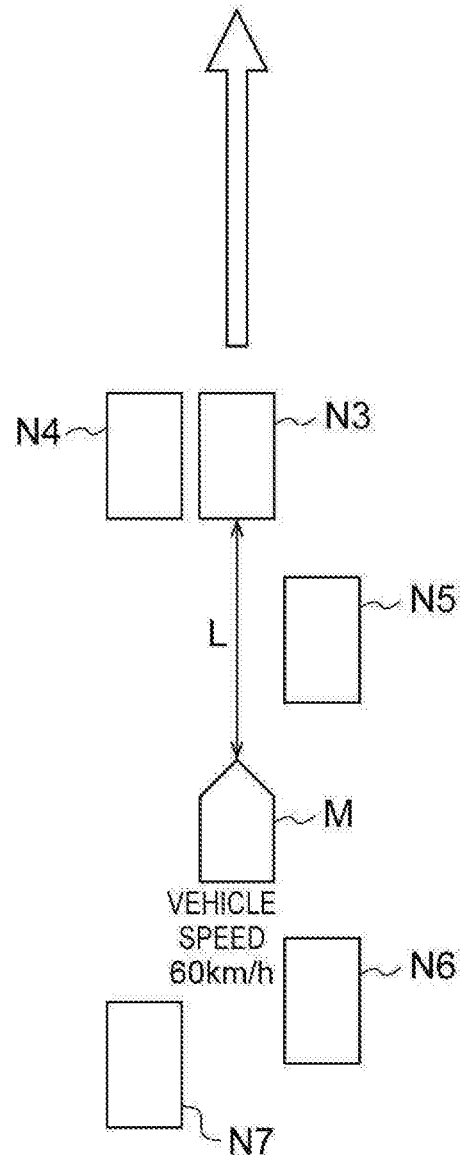

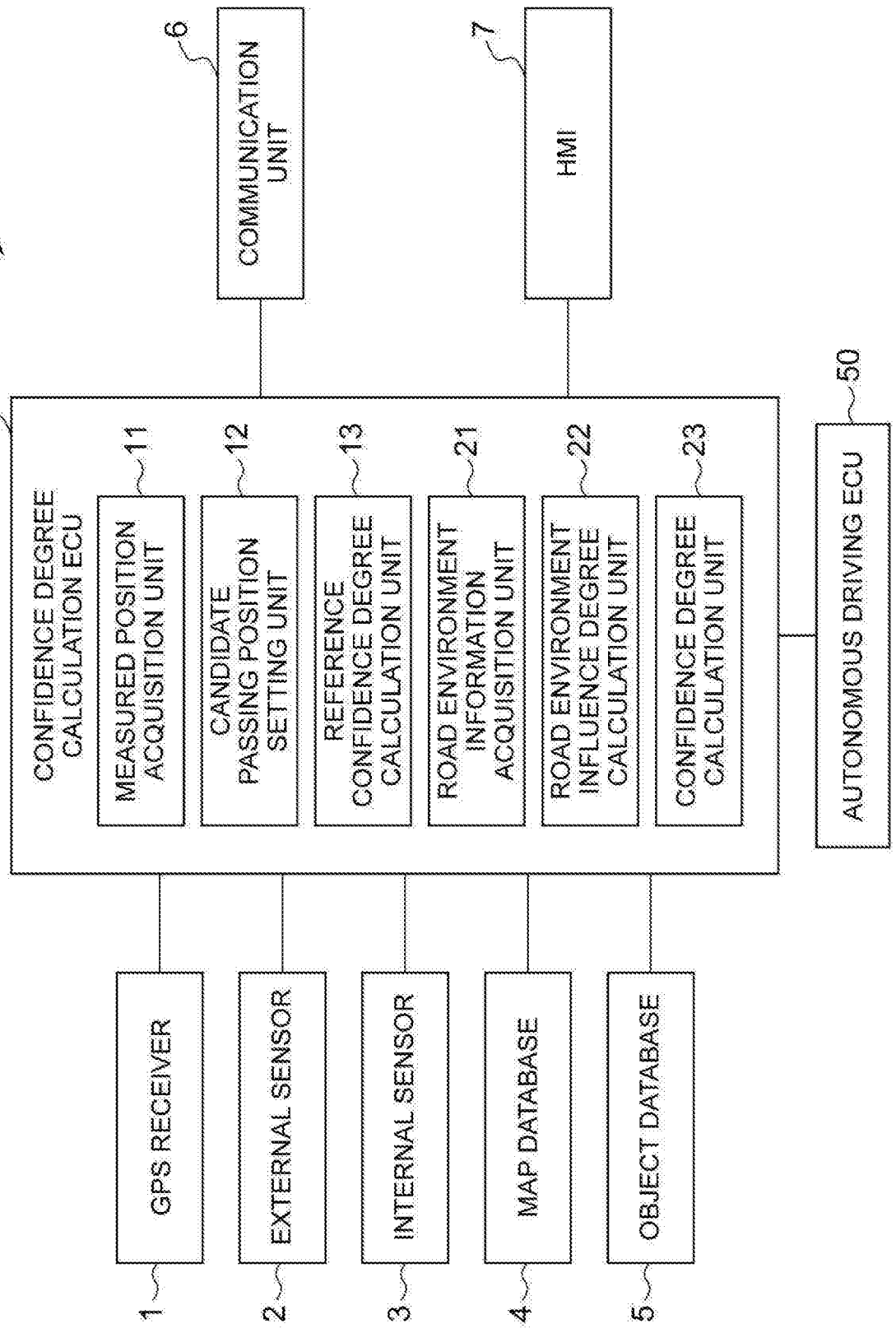

HOST VEHICLE POSITION CONFIDENCE DEGREE CALCULATION DEVICE

TECHNICAL FIELD

The present disclosure relates to a host vehicle position confidence degree calculation device.

BACKGROUND

In the related art, Japanese Unexamined Patent Publication No. 2017-072423 is known as a technical literature relating to an estimation of a position of a host vehicle. In the literature, a device for estimating the position of the host vehicle based on position information on an object (target object: a pole or the like) on a map and a distance and angle to the object from the vehicle obtained by a LIDAR, is disclosed.

CROSS-REFERENCE TO RELATED APPLICATION

This application claims the benefit of priority from Japanese Patent Application No. 2017-162479, filed Aug. 25, 2017, the entire contents of which are incorporated herein by reference.

SUMMARY

However, it is difficult to always assure a certain degree of accuracy with regard to such an estimation of the host vehicle, and a confidence degree (probability) in estimating the position of the host vehicle changes due to various factors. Since the confidence degree in estimating the position of the host vehicle influences various vehicle controls and driver's route guidance, it is desirable to appropriately grasp the confidence degree.

Here, in the present technical field, it is desired to provide a host vehicle position confidence degree calculation device that can appropriately obtain the confidence degree in estimating the position of the host vehicle.

A host vehicle position confidence degree calculation device according to an aspect of the present disclosure is configured to include: an object database configured to store position information on an object on a map used for estimating a position of a host vehicle; a reference confidence degree calculation unit configured to calculate a reference confidence degree in estimating the position of the host vehicle at a candidate passing position of the host vehicle set in advance based on the position information on the object on the map; a shield information acquisition unit configured to acquire shield information on a shield around the host vehicle based on a result of detection performed by a vehicle-mounted sensor of the host vehicle; a shielding influence degree calculation unit configured to calculate a shielding influence degree in estimating the position of the host vehicle at the candidate passing position based on the shield information; and a confidence degree calculation unit configured to calculate a confidence degree in estimating the position of the host vehicle at the candidate passing position based on the reference confidence degree and the shielding influence degree.

The host vehicle position confidence degree calculation device according to the aspect of the present disclosure calculates the reference confidence degree at the candidate passing position based on the position information on the object on the map, and calculates the shielding influence degree at the candidate passing position based on the shield information. Therefore, according to the host vehicle position confidence degree calculation device described above, it is possible to appropriately obtain the confidence degree in estimating the position of the host vehicle based on the reference confidence degree while considering the arrangement of the objects at the candidate passing position and based on the shielding influence degree while considering the shields around the host vehicle.

In the host vehicle position confidence degree calculation device according to the aspect of the present disclosure, the shielding influence degree calculation unit may calculate the shielding influence degree based on a control content set in advance and the shield information if the host vehicle is performing a vehicle control according to the control content.

The host vehicle position confidence degree calculation device according to the aspect of the present disclosure may further include: a road environment information acquisition unit configured to acquire road environment information at the candidate passing position; and a road environment influence degree calculation unit configured to calculate a road environment influence degree in estimating the position of the host vehicle at the candidate passing position based on the road environment information. The confidence degree calculation unit may calculate the confidence degree in estimating the position of the host vehicle at the candidate passing position based on the reference confidence degree, the shielding influence degree, and the road environment influence degree.

A host vehicle position confidence degree calculation device according to another aspect of the present disclosure is configured to include: an object database configured to store position information on an object on a map used for estimating a position of a host vehicle; a reference confidence degree calculation unit configured to calculate a reference confidence degree in estimating the position of the host vehicle at a candidate passing position of the host vehicle set in advance based on the position information on the object on the map; a road environment information acquisition unit configured to acquire road environment information at the candidate passing position; a road environment influence degree calculation unit configured to calculate a road environment influence degree in estimating the position of the host vehicle at the candidate passing position based on the road environment information; and a confidence degree calculation unit configured to calculate the confidence degree in estimating the position of the host vehicle at the candidate passing position based on the reference confidence degree and the road environment influence degree.

The host vehicle position confidence degree calculation device according to another aspect of the present disclosure calculates the reference confidence degree at the candidate passing position based on the position information on the object on the map, and calculates the road environment influence degree based on the road environment information. Therefore, according to the host vehicle position confidence degree calculation device described above, it is possible to appropriately obtain the confidence degree in estimating the position of the host vehicle based on the reference confidence degree while considering the arrangement of the objects at the candidate passing position and based on the road environment influence degree while considering the road environment information such as the traffic jam that interferes with the detection of the object.

The host vehicle position confidence degree calculation device in the aspect of the present disclosure may further include a candidate passing position setting unit configured to set the candidate passing position on a target route of the host vehicle set in advance based on the target route.

As described above, according to the aspects of the present disclosure, the confidence degree in estimating the position of the host vehicle can appropriately be obtained.

BRIEF DESCRIPTION OF THE DRAWINGS

FIG. 2 is a diagram for explaining calculation of a reference confidence degree.

FIG. 4 is a diagram for explaining calculation of the shielding influence degree while considering a travel plan in autonomous driving.

FIG. 7 is a block diagram illustrating a host vehicle position confidence degree calculation device in a second embodiment.

DETAILED DESCRIPTION

Hereinafter, embodiments of the present disclosure will be described with reference to the drawings.

First Embodiment

Figure 1:
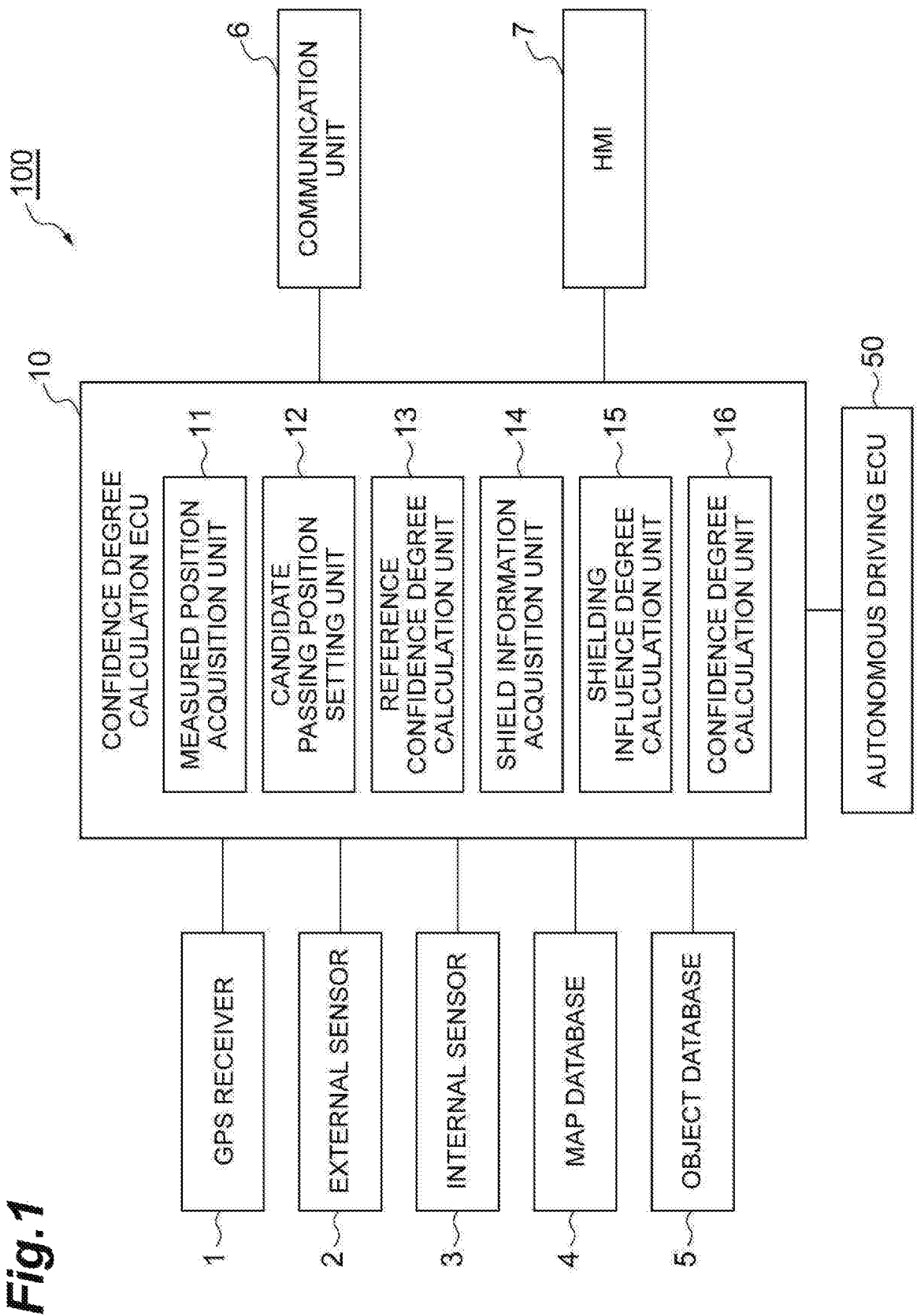
FIG. 1 is a block diagram illustrating a host vehicle position confidence degree calculation device in a first embodiment.

FIG. 1 is a block diagram illustrating a host vehicle position confidence degree calculation device in a first embodiment. As illustrated in FIG. 1, a host vehicle position confidence degree calculation device 100 in the first embodiment calculates a confidence degree in estimating the position of the host vehicle (localization) of a host vehicle such as a passenger car. The estimation of the position of the host vehicle means an estimation of the position of the host vehicle on a map using position information of an object on the map. A well-known method can be adopted for the estimation of the position of the host vehicle. Details of the object will be described later.

The host vehicle position confidence degree calculation device 100 does not perform the estimation of the position of the host vehicle, but calculates the confidence degree in estimating the position of the host vehicle. The host vehicle position confidence degree calculation device 100 may configure a part of a host vehicle position estimation device which performs the estimation of the position of the host vehicle. Configuration of Host Vehicle Position Confidence Degree Calculation Device in the First Embodiment.

As illustrated in FIG. 1, the host vehicle position confidence degree calculation device 100 includes a confidence degree calculation ECU (Electronic Control Unit) 10 that performs overall management of the system. The confidence degree calculation ECU 10 is an electronic control unit including a central processing unit (CPU), read only memory (ROM), random access memory (RAM), a controller area network (CAN) communication network, and the like. In the confidence degree calculation ECU 10, for example, various functions are realized by loading a program stored in the ROM into the RAM and executing the program loaded in the RAM by the CPU. The confidence degree calculation ECU 10 may be configured with a plurality of electronic units.

The confidence degree calculation ECU 10 is connected to a GPS receiver 1, an external sensor 2, an internal sensor 3, a map database 4, an object database 5, a communication unit 6, a human machine interface (HMI) 7, and an autonomous driving ECU 50.

The GPS receiver 1 is a measurement unit that measures a position of the host vehicle on the map (for example, latitude and longitude of the vehicle) by receiving signals from equal to or more than three GPS satellites. The GPS receiver 1 transmits the measured position information of the host vehicle to the confidence degree calculation ECU 10.

The external sensor 2 is a detection device that detects a surrounding environment of the host vehicle. The external sensor 2 includes at least one of a camera and a radar sensor.

The camera is an imaging device that images the external situation of the host vehicle. The camera is provided on the inside of windshield of the host vehicle. The camera transmits image information relating to the external situation of the host vehicle to the confidence degree calculation ECU 10. The camera may be a monocular camera or may be a stereo camera. The stereo camera has two imaging units that are arranged so as to reproduce a binocular parallax. The imaging information of the stereo camera also includes information on the depth direction.

The radar sensor is a detection device that detects obstacles around the host vehicle using radio waves (for example, millimeter waves) or light. The radar sensor includes, for example, millimeter wave radar or a light detection and ranging (LIDAR). The radar sensor transmits the radio wave or light to the surroundings of the host vehicle, and detects the obstacles by receiving radio waves or light reflected from obstacles. The radar sensor transmits the detected obstacle information to the confidence degree calculation ECU 10. Obstacles include fixed objects such as guardrails and buildings, and pedestrians, bicycles, other vehicles, and the like.

The internal sensor 3 is a detection device that detects a traveling state of the host vehicle. The internal sensor 3 includes a vehicle speed sensor, an accelerator sensor, and a yaw rate sensor. The vehicle speed sensor is a detection device that measures a speed of the host vehicle. As the vehicle speed sensor, for example, a vehicle wheel speed sensor is used, which is provided on vehicle wheels of the host vehicle or on a drive shaft rotating integrally with vehicle wheels, and measures a rotational speed of the vehicle wheels. The vehicle speed sensor transmits the detected vehicle speed information (vehicle wheel speed information) to the confidence degree calculation ECU 10.

The accelerator sensor is a detection device that measures an acceleration of the host vehicle. The accelerator sensor includes, for example, a longitudinal accelerator sensor that measures acceleration in the longitudinal direction of the host vehicle and a lateral accelerator sensor that measures a lateral acceleration of the host vehicle. The accelerator sensor transmits, for example, acceleration information of the host vehicle to the confidence degree calculation ECU 10. The yaw rate sensor is a detection device that measures a yaw rate (rotation angular velocity) around the vertical axis at the center of gravity of the host vehicle. As the yaw rate sensor, for example, a Gyro sensor can be used. The yaw rate sensor transmits the detected yaw rate information of the host vehicle input device to the confidence degree calculation ECU 10. The result of detection performed by the internal sensor 3 (vehicle speed information, yaw rate information, and the like) may be used for measuring the position of the host vehicle on the map. In this case, the internal sensor 3 functions as a measurement unit for measuring the position of the host vehicle on the map.

The map database 4 is a database storing map information. The map database 4 is formed, for example, in a hard disk drive (HDD) mounted on the vehicle. The map information includes information on the position of the road, information on the shape of the road (for example, a curvature of the curve or the like), information on the location of the intersection and the branch. The map information may include information on a position of a structure such as a building. The map database 4 may be formed in a server capable of communicating with the host vehicle.

The object database 5 is a database that stores position information on an object on the map. The object is a mark whose position on the map is fixed, and is used as a reference for the estimation of the position of the host vehicle. The object includes at least one of a structure provided on a road or around the road and a road sign appeared on a road surface. The object may include a part of the structure or a part of the road sign. The object may include a so-called landmark.

The structure includes at least one of a pole, a road sign, a guardrail, a denilator, a wall, a traffic signal, an exit and entrance of a tunnel, an ETC gate, and a building. The road sign includes at least one of a regulatory sign and an instruction sign. The regulatory sign includes a turn prohibition mark, a maximum speed mark, and the like. The instruction sign includes a lane line (a roadway center line, a roadway outside line, a lane boundary line, and the like), a rhombic mark indicating that there is a pedestrian crossing ahead, a triangle mark indicating that there is a priority road ahead, a traveling direction mark, a crosswalk sign, a temporary stop line, and the like.

If the lane line is appeared as continuous dotted lines, each dotted line may be treated as an object. In addition, end portions (front end and rear end) in the road extending direction of each dotted line may be treated as the objects respectively. In addition, welt-known objects in the technical field of in estimating the position of the host vehicle can be adopted as the objects.

In addition, collation information (information on the shape of the object, the size of the object, and the like) for collating the result of detection performed by the external sensor 2 with the object is stored in the object database 5 for each object. Well-known information can be adopted for the collation information. The object database 5 may be formed in a server capable of communicating with the host vehicle. The object database 5 may be a database integrated with the map database 4.

The communication unit 6 is a device for communicating via a wireless network (for example, the Internet, vehicle information and communication System® (VICS) or the like). The communication unit 6 acquires various kinds of information through the wireless network. The communication unit 6 may have a function of performing vehicle-to-vehicle communication between the host vehicle and another vehicle. It is not necessarily for the confidence degree calculation ECU 10 to be connected to the communication unit 6.

The HMI 7 is an interface that performs inputting and outputting of the information between the host vehicle position confidence degree calculation device 100 and the occupant (including the driver), The HMI 7 includes, for example, a display, a speaker, and the like. The HMI 7 outputs an image on the display and outputs a voice from the speaker according to a control signal from the confidence degree calculation ECU 10. The display may be a head-up display. The HMI 7 includes input devices (buttons, a touch panel, a voice input device, or the like) for accepting input from the occupant. It is not necessary for the confidence degree calculation ECU 10 to be connected to the HMI 7.

The autonomous driving ECU 50 is mounted on the host vehicle and is an electronic control unit for performing the autonomous driving of the host vehicle. The autonomous driving means a vehicle control in which the host vehicle autonomously travels without a driving operation by a driver. A part of the functions of the autonomous driving ECU 50 may be performed by a server capable of communicating with the host vehicle.

The autonomous driving ECU 50 generates a travel plan along the target route set in advance based on the position information on the host vehicle measured by the GPS receiver 1, the map information in the map database 4, the surrounding environment (the position of another vehicle, or the like) of the host vehicle recognized from the result of detection performed by the external sensor 2, and the vehicle state (vehicle speed, yaw rate, and the like) recognized from the result of detection performed by the internal sensor 3. The target route is set by the occupant of the host vehicle or a well-known navigation system. The navigation system may be integrated in the autonomous driving ECU 50.

The autonomous driving ECU 50 performs the autonomous driving according to the travel plan. The autonomous driving ECU 50 performs the autonomous driving by transmitting a control signal to actuators of the host vehicle (an engine actuator, a steering actuator, a brake actuator, or the like). The autonomous driving ECU 50 can generate a travel plan and perform the autonomous driving using a well-known method. It is not necessary for the confidence degree calculation. ECU 10 to be connected to the autonomous driving ECU 50.

Next, a functional configuration of the confidence degree calculation ECU 10 will be described. The confidence degree calculation ECU 10 includes a measured position acquisition unit 11, a candidate passing position setting unit 12, a reference confidence degree calculation unit 13, a shield information acquisition unit 14, a shielding influence degree calculation unit 15, and a confidence degree calculation unit 16. A part of the functions of the confidence degree calculation ECU 10 described below may be performed in the server capable of communicating with the host vehicle.

The measured position acquisition unit 11 acquires a measured position which is a position of the host vehicle on the map based on the position information on the host vehicle measured by the GPS receiver 1. The measured position acquisition unit 11 may acquire the measured position of the host vehicle from a history of the vehicle speed (or the history of the wheel rotation speed) of the host vehicle and the history of the yaw rate of the host vehicle based on the result of detection performed by the internal sensor 3. In other words, the measured position acquisition unit 11 may acquire the measured position of the host vehicle by a so-called odometry using a well-known method.

The measured position of the host vehicle is used as a premise of the in estimating the position of the host vehicle using the object. The measured position of the host vehicle is measured by the measurement unit in the host vehicle (the GPS receiver 1, the internal sensor 3, or the like).

The candidate passing position setting unit 12 sets a candidate passing position based on the measured position of the host vehicle acquired by the measured position acquisition unit 11 and the map infoi illation in the map database 4. The "candidate passing position" means a position on the map, in which is a calculation target of the confidence degree in estimating the position of the host vehicle.

An example of the candidate passing position includes a position a fixed distance ahead of the measured position of the host vehicle in the traveling lane in which the host vehicle is traveling. The fixed distance can be, for example, 1 m, 5 m, or 10 m.

If the target route on which the host vehicle travels is set, the candidate passing position setting unit 12 may set the candidate passing position on the target route of the host vehicle. The candidate passing position setting unit 12 can set a plurality of candidate passing positions. For example, the candidate passing position setting unit 12 may set a plurality of candidate passing positions in a traveling lane of the host vehicle at a fixed distance interval. In addition, the candidate passing position does not necessarily have to be the position where the host vehicle passes. The candidate passing position may be set for each of the plurality of lanes branching from the traveling lane.

The reference confidence degree calculation unit 13 calculates the reference confidence degree in estimating the position of the host vehicle at the candidate passing position set by the candidate passing position setting unit 12 based on the position information on the object on the map stored in the object database 5. The reference confidence degree calculation unit 13 calculates the reference confidence degree using a candidate passing position set in advance before the calculation of the reference confidence degree. The reference confidence degree is an index indicating the probability in estimating the position of the host vehicle using the object, and is an index calculated from the position information of the object on the map without considering a shield to be described later.

As an example, the reference confidence degree calculation unit 13 calculates the reference confidence degree at the candidate passing position using the number of objects that can be detected by the external sensor 2 in the host vehicle when the host vehicle reaches the candidate passing position. Here, FIG. 2 is a diagram for explaining the calculation of the reference confidence degree. FIG. 2 illustrates a host vehicle M, a candidate passing position d, a host vehicle Md reaching the candidate passing position d, and a sensor detection range E of the external sensor 2 at the position of the host vehicle Md. In this example, the sensor detection range E is exemplified as a circular range with a fixed distance centered on the host vehicle Md. The sensor detection range E is a range set in advance.

The sensor detection range E is not limited to the circular range. The sensor detection range E may be a fan-shaped range. The sensor detection range E may be a wide angle detection range corresponding to an imaging range of the camera or may be a narrow angle detection range corresponding to the radar sensor. A detection range of a plurality of radar sensors and/or a detection range of a plurality of cameras can be included in the sensor detection range E. In addition, the sensor detection range E does not need to coincide with the detection range of the actual external sensor 2, and may be a range set virtually.

FIG. 2 illustrates poles PL1 to PL3 included in the sensor detection range E, poles PL4 not included in the sensor detection range E, and lane lines L1 to L4 partially included in the sensor detection range E. The poles PL1 to PL4 and the lane lines L1 to L4 are objects whose position information is stored in the object database 5.

In a situation illustrated in FIG. 2, the reference confidence degree calculation unit 13 recognizes that the number of objects included in the sensor detection range E at the candidate passing position d is seven (the poles PL1 to PL3 and the lane lines L1 to L4) based on the position information on the object on the map. The pole PL4 is not included in the sensor detection range E. The reference confidence degree calculation unit 13 calculates the reference confidence degree in estimating the position of the host vehicle at the candidate passing position d according to the number of objects included in the sensor detection range E.

As an example, if the number of objects is equal to or greater than a number threshold value, the reference confidence degree calculation unit 13 calculates the reference confidence degree as a higher value compared to a case where the number of objects is less than the number threshold value. The number threshold value is a value set in advance. If the number threshold value is 3, as illustrated in FIG. 2, when the number of objects included in the sensor detection range E is seven, the reference confidence degree calculation unit 13 can calculate the reference confidence degree as a higher value compared to a case where the number of objects included in the sensor detection range E is one. The reference confidence degree calculation unit 13 may change the value of the reference confidence degree step by step by providing a plurality of number threshold values.

In addition, the reference confidence degree calculation unit 13 may continuously calculate the reference confidence degree as a higher value as the number of objects increases. The reference confidence degree calculation unit 13 may calculate the reference confidence degree as zero if no object is included in the sensor detection range E at the candidate passing position d.

The reference confidence degree calculation unit 13 may calculate the reference confidence degree using a distance to the object closest to the candidate passing position d in the sensor detection range E instead of using the number of objects. The reference confidence degree calculation unit 13 calculates the distance (linear distance) to the object closest to the candidate passing position d in the sensor detection range E, based on the position information on the object on the map.

If the distance to the closest object is shorter than a distance threshold value, the reference confidence degree calculation unit 13 calculates the reference confidence degree as a higher value compared to a case where the distance is equal to or longer than the distance threshold value. The distance threshold value is a preset value. The reference confidence degree calculation unit 13 may change the value of the reference confidence degree step by step by providing a plurality of distance threshold values. In addition, the reference confidence degree calculation unit 13 may continuously calculate the reference confidence degree as a higher value as the distance to the closest object decreases.

If a plurality of objects are present in the sensor detection range E, the reference confidence degree calculation unit 13 may calculate the reference confidence degree using an average value or a median value of the distances to the plurality of objects with the candidate passing position d as a reference, instead of using the distance to the object closest to the candidate passing position d within the sensor detection range E.

The reference confidence degree calculation unit 13 may calculate the reference confidence degree by combining the number of objects and the distance to the object. Specifically, if the numbers of objects in the sensor detection range E are the same, the reference confidence degree calculation unit 13 can calculate the reference confidence degree as a higher value when the distance to the closest object is shorter than the distance threshold value compared to a case when the distance to the closest object is equal to or longer than the distance threshold value. Similarly, if the distances to the closest object are the same, the reference confidence degree calculation unit 13 can calculate the reference confidence degree as a higher value when the number of objects in the sensor detection range E is equal to or greater than the number threshold value compared to a case when the number of objects in the sensor detection range E is less than the number threshold value.

The shield information acquisition unit 14 acquires shield information on a shield around the host vehicle M based on the result of detection performed by the external sensor 2. The shield information is information on shields such as other vehicles that interfere with the detection of the external sensor 2.

Examples of the shield include moving shields such as other vehicles, bicycles, pedestrians, and the like. Shields may include stationary shields of trees, median, strips, guardrails, utility poles, walls, buildings, and the like.

The shield information acquisition unit 14 may acquire the information on the stationary shield not only based on the result of detection performed by the external sensor 2 but also based on the map data relating to the stationary shield prepared in advance and the measured position of the host vehicle. The map data relating to the stationary shield includes information on the position of the stationary shield on the map. In the map data, the stationary shields do not need to be individually distinguished, and if a tree branch is in contact with the guardrail, the tree branch and the guardrail may be treated as a series of stationary shields. In addition, the shield information acquisition unit 14 may acquire shield information on other vehicles by performing a vehicle-to-vehicle communication with other vehicles via the communication unit 6.

The shielding influence degree calculation unit 15 calculates a shielding influence degree in estimating the position of the host vehicle at the candidate passing position d based on the shield information acquired by the shield information acquisition unit 14. The shielding influence degree means a degree of influence by the shield in estimating the position of the host vehicle.

Figure 3:
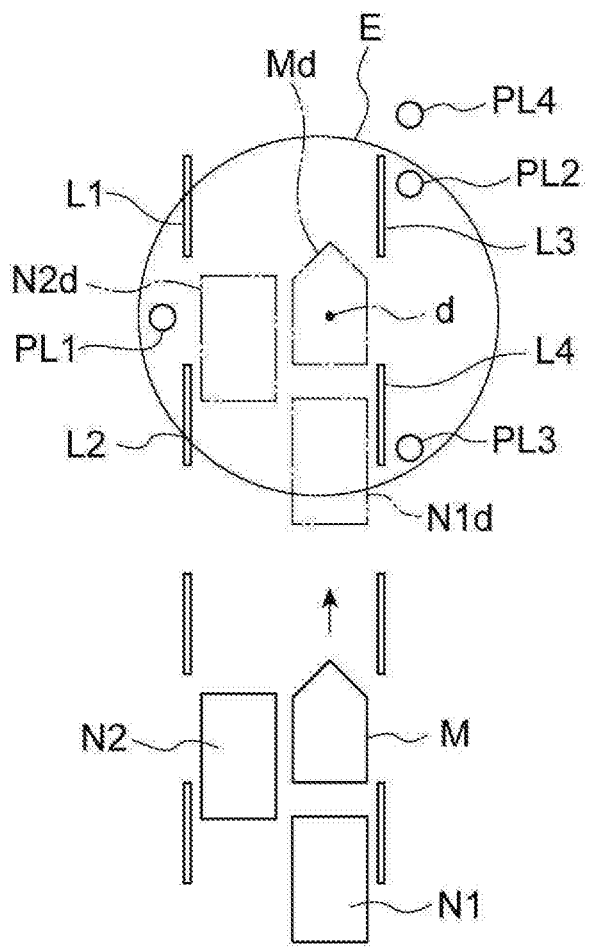
FIG. 3 is a diagram for explaining calculation of a shielding influence degree.

FIG. 3 is a diagram for explaining the calculation of the shielding influence degree. In FIG. 3, a following vehicle N1 that follows the host vehicle M and a parallel traveling vehicle N2 that travels parallel to the host vehicle M are illustrated. In addition, the following vehicle N1 when the host vehicle M reaches the candidate passing position d is illustrated as a following vehicle N1d, and the parallel traveling vehicle N2 when the host vehicle M reaches the candidate passing position d is illustrated as a parallel traveling vehicle N2d. In the situation illustrated in FIG. 3, the parallel traveling vehicle N2 interfere with the detection of the object on the left side of the host vehicle M (pole PL1 and lane line L2). Therefore, the number of objects for the host vehicle M to use for estimating the position of the host vehicle decreases due to the presence of the parallel traveling vehicle N2 compared to the case where the parallel traveling vehicle N2 is not present. As described above, due to the presence of the parallel traveling vehicle N2 which becomes a shield, the confidence degree in estimating the position of the host vehicle (probability) is influenced. Therefore, the shielding influence degree calculation unit 15 calculates the shielding influence degree in estimating the position of the host vehicle at the candidate passing position d based on the shield information.

As an example, when it is recognized that a parallel traveling vehicle is present based on shield information, the shielding influence degree calculation unit 15 calculates the shielding influence degree as a higher value compared to a case where the parallel traveling vehicle is not present. Similarly, if it is recognized that a preceding vehicle is present, the shielding influence degree calculation unit 15 may calculate the shielding influence degree as a higher value compared to a case where the preceding vehicle is not present. If it is recognized that the following vehicle is present, the shielding influence degree calculation unit 15 may calculate the shielding influence degree as a higher value compared to the case where the following vehicle is not present.

If the host vehicle M performs the autonomous driving by the autonomous driving ECU 50, the shielding influence degree calculation unit 15 may calculate the shielding influence degree in estimating the position of the host vehicle at the candidate passing position d based on the travel plan in the autonomous driving (a content of control set in advance) and the shield information. The shielding influence degree calculation unit 15 can calculate the shielding influence degree in estimating the position of the host vehicle at the candidate passing position d by predicting the situation of the shield such as other vehicles (the relative position with respect to the host vehicle M) at the candidate passing position d based on the travel plan in the autonomous driving and the shield information. For the prediction of the situation of the shields such as other vehicles, a well-known behavior prediction technology for other vehicles can be used.

Here, FIG. 4 is a diagram for explaining the calculation of the shielding influence degree while considering the travel plan in the autonomous driving. FIG. 4 illustrates a preceding vehicle N3, a left front traveling vehicle N4, a right side parallel traveling vehicle N5, a rear right side traveling vehicle N6, and a rear left side traveling vehicle N7 of the host vehicle M. In addition, In FIG. 4, the preceding vehicle N3 when the host vehicle M reaches the candidate passing position d is illustrated as a preceding vehicle N3d. Similarly, a right side parallel traveling vehicle N5d, a rear right side traveling vehicle N6d, and a rear left side traveling vehicle N7d when the host vehicle M reaches the candidate passing position d are illustrated. In addition, a vehicle-to-vehicle distance between the host vehicle M and the preceding vehicle N3 is illustrated as L, and a vehicle-to-vehicle distance between the host vehicle Md and the preceding vehicle N3d at the candidate passing position d is illustrated as Ld.

In the situation illustrated in FIG. 4, in the travel plan generated by the autonomous driving ECU 50, the host vehicle M decreases the vehicle speed from the current vehicle speed of 60 kmlh to 20 km/h at the candidate passing position d by detecting or predicting a red signal of the traffic signal ahead using a well-known method. In addition, the vehicle-to-vehicle distance L between the host vehicle M and the preceding vehicle N3 is decreased to a vehicle-to-vehicle distance Ld between the host vehicle Md and the preceding vehicle N3d at the candidate passing position d. The vehicle-to-vehicle distance L is 60 in, for example, and the vehicle-to-vehicle distance Ld is 30 m, for example.

In the situation illustrated in FIG. 4, the shielding influence degree calculation unit 15 predicts that the host vehicle Md is surrounded by other vehicles N3d to N7d at the candidate passing position d by the fact that the vehicle speeds of other surrounding vehicles N3 to N7 are also decreased due to the influence of the red light of the traffic signal based on the travel plan in the autonomous driving and the shield information. The shielding influence degree calculation unit 15 calculates the shielding influence degree in estimating the position of the host vehicle at the candidate passing position d based on the prediction of the situation of the shield at the candidate passing position d.

The confidence degree calculation unit 16 calculates the confidence degree in estimating the position of the host vehicle in the candidate passing position d based on the reference confidence degree at the candidate passing position d calculated by the reference confidence degree calculation unit 13 and the shielding influence degree at the candidate passing position d calculated by the shielding influence degree calculation unit 15. The confidence degree in estimating the position of the host vehicle is the probability of the in estimating the position of the host vehicle using the object.

The confidence degree calculation unit 16 may calculate the confidence degree in estimating the position of the host vehicle from the reference confidence degree and the shielding influence degree using a calculation formula set in advance. The confidence degree calculation unit 16 may calculate the confidence degree in estimating the position of the host vehicle from the reference confidence degree and the shielding influence degree using a table data in which the reference confidence degree, the shielding influence degree, and the confidence degree in estimating the position of the host vehicle are associated with each other in advance.

As an example, the confidence degree calculation unit 16 can calculate a difference value obtained by subtracting the shielding influence degree from the reference confidence degree as the confidence degree in estimating the position of the host vehicle. The confidence degree calculation unit 16 may calculate the value obtained by multiplying the reference confidence degree by the shielding influence degree (or the weighting coefficient corresponding to the shielding influence degree) as the confidence degree in estimating the position of the host vehicle.

If the shielding influence degrees are the same, when the reference confidence degree is equal to or higher than a reference threshold value, the confidence degree calculation unit 16 may set the confidence degree in estimating the position of the host vehicle to a higher value compared to a case when the reference confidence degree is lower than the reference threshold value. The reference threshold value is a value set in advance. The confidence degree calculation unit 16 may change the confidence degree in estimating the position of the host vehicle step by step by providing a plurality of reference threshold values.

If the reference confidence degrees are the same, when the shielding influence degree is equal to or higher than a shielding threshold value, the confidence degree calculation unit 16 may set the confidence degree in estimating the position of the host vehicle to a lower value compared to a case when the shielding influence degree is lower than the shielding threshold value. The shielding threshold value is a value set in advance. The confidence degree calculation unit 16 may change the confidence degree in estimating the position of the host vehicle step by step by providing a plurality of shielding threshold values.

If the shielding influence degrees are the same, the confidence degree calculation unit 16 may continuously set the confidence degree in estimating the position of the host vehicle as a higher value as the reference confidence degree increases. If the reference confidence degrees are the same, the confidence degree calculation unit 16 may continuously set the confidence degree in estimating the position of the host vehicle as a lower value as the shielding influence degree increases.

The confidence degree calculation unit 16 may calculate the confidence degree in estimating the position of the host vehicle at the candidate passing position d as a high confidence degree or a low confidence degree. For example, if the reference confidence degree is equal to or higher than the reference threshold value, the confidence degree calculation unit 16 calculates the confidence degree in estimating the position of the host vehicle as a high confidence degree. On the other hand, if the reference confidence degree is lower than the reference threshold value, the confidence degree calculation unit 16 determines whether or not the difference value obtained by subtracting the shielding influence degree from the reference confidence degree is equal to or higher than a difference threshold value. The difference threshold value is a value set in advance. If it is determined that the difference value obtained by subtracting the shielding influence degree from the reference confidence degree is equal to or higher than the difference threshold value, the confidence degree calculation unit 16 calculates the confidence degree in estimating the position of the host vehicle as a high confidence degree. If it is not determined that the difference value obtained by subtracting the shielding influence degree from the reference confidence degree is equal to or higher than the difference threshold value, the confidence degree calculation unit 16 calculates the confidence degree in estimating the position of the host vehicle as a low confidence degree.

The confidence degree calculation unit 16 may notify the driver of, or may display the confidence degree in estimating the position of the host vehicle at the candidate passing position d via the HMI 7 according to the driver's request. The confidence degree calculation unit 16 may transmit the confidence degree in estimating the position of the host vehicle at the candidate passing position d to the autonomous driving ECU 50, In this case, the autonomous driving ECU 50 can generate or modify a travel plan based on the confidence degree in estimating the position of the host vehicle at the candidate passing position d. The autonomous driving ECU 50 may change the target route based on the confidence degree in estimating the position of the host vehicle at the candidate passing position d.

In addition, the autonomous driving ECU 50 may perform autonomous driving of the host vehicle M such that the confidence degree in estimating the position of the host vehicle at the candidate passing position d rises. If the confidence degree in estimating the position of the host vehicle at the candidate passing position d is lower than the confidence degree threshold value, the autonomous driving ECU 50 may control the vehicle speed of the host vehicle M such that the detection of the object at the candidate passing position d is not interfered based on the current travel plan and the shield information.

Specifically, if the detection of the object located on the left side of the host vehicle M is interfered by the parallel traveling vehicle, the autonomous driving ECU 50 may decelerate the host vehicle M such that the host vehicle M precedes the parallel traveling vehicle before reaching the candidate passing position d. In this case, the autonomous driving ECU 50 may control the vehicle speed of the host vehicle M on the assumption that the vehicle speed of the parallel traveling vehicle does not change (the current vehicle speed is maintained). The autonomous driving ECU 50 may predict the change of the vehicle speed of the parallel traveling vehicle from the behavior of the parallel traveling vehicle, and may control the vehicle speed of the host vehicle M based on the result of prediction using a well-known technology.

Figure 5:
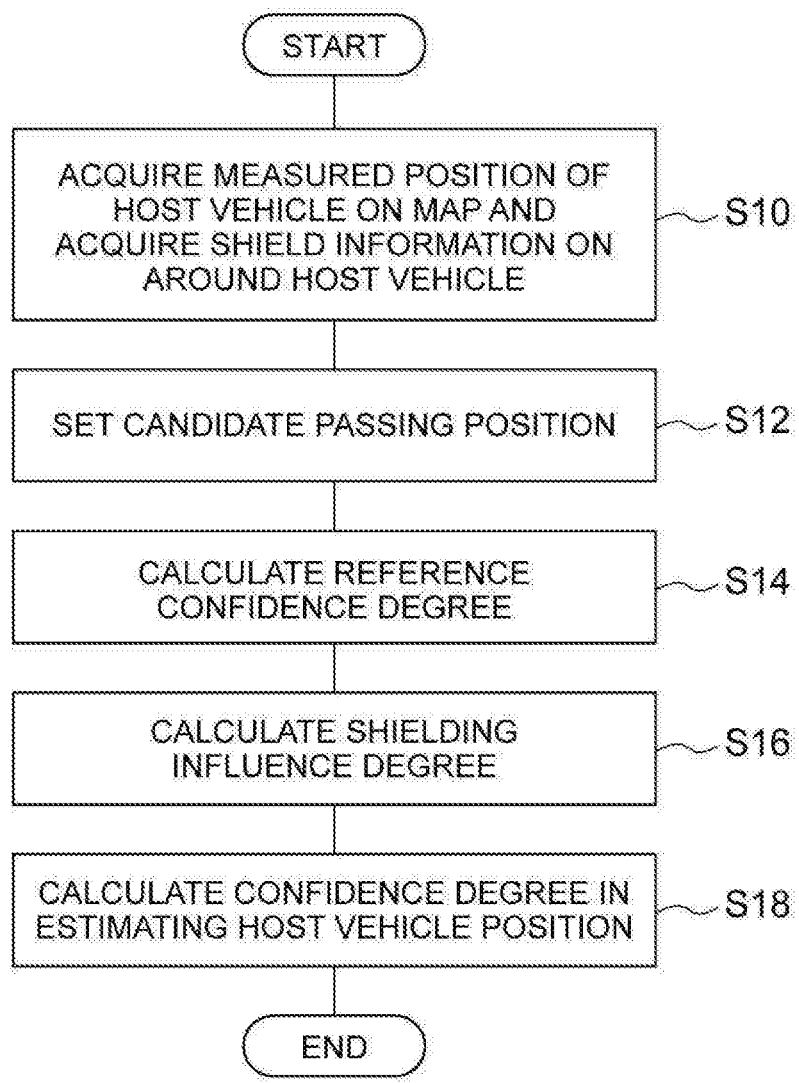
FIG. 5 is a flowchart illustrating an example of confidence degree calculation processing in the first embodiment.

An example of Confidence Degree Calculation Processing by the Host Vehicle Position Confidence Degree Calculation Device in the First Embodiment Next, an example of confidence degree calculation processing by the host vehicle position confidence degree calculation device 100 will be described. FIG. 5 is a flowchart illustrating an example of the confidence degree calculation processing in the first embodiment. The processing in the flowchart illustrated in FIG. 5 is performed while the host vehicle M is traveling.

As illustrated in FIG. 5, as S10, the confidence degree calculation ECU 10 of the host vehicle position confidence degree calculation device 100 acquires the measured position of the host vehicle M using the measured position acquisition unit 11. The measured position acquisition unit 11 acquires the measured position which is the position of the host vehicle on the map based on the position information on the host vehicle measured by the GPS receiver 1. The measured position acquisition unit 11 may acquire the measured position of the host vehicle M from the history of the rotation speed of the wheel and the history of the yaw rate of the host vehicle and the like based on the result of detection performed by the internal sensor 3. In addition, in S10, the confidence degree calculation ECU 10 acquires shield information using the shield information acquisition unit 14. The shield information acquisition unit 14 acquires the shield information on the shield around the host vehicle M based on the result of detection performed by the external sensor 2.

In S12, the confidence degree calculation ECU 10 sets the candidate passing position d using the candidate passing position setting unit 12. The candidate passing position setting unit 12 sets the candidate passing position based on the measured position of the host vehicle acquired by the measured position acquisition unit 11 and the map information in the map database 4.

In S14, the confidence degree calculation ECU 10 calculates the reference confidence degree in estimating the position of the host vehicle at the candidate passing position d using the reference confidence degree calculation unit 13. The reference confidence degree calculation unit 13 calculates the reference confidence degree in estimating the position of the host vehicle at the candidate passing position d based on the position information on the object on the map stored in the object database 5. As an example, the reference confidence degree calculation unit 13 calculates the reference confidence degree in estimating the position of the host vehicle at the candidate passing position d based on the number of objects included in the sensor detection range E when the host vehicle M reached the candidate passing position d.

In S16, the confidence degree calculation ECU 10 calculates the shielding influence degree in estimating the position of the host vehicle at the candidate passing position d using the shielding influence degree calculation unit 15. The shielding influence degree calculation unit 15 calculates the shielding influence degree in estimating the position of the host vehicle at the candidate passing position d based on the shield infointation acquired by the shield information acquisition unit 14. S14 and S16 may be performed in reverse order, or may be performed in parallel.

In S18, the confidence degree calculation ECU 10 calculates the confidence degree in estimating the position of the host vehicle at the candidate passing position d using the confidence degree calculation unit 16. The confidence degree calculation unit 16 calculates the confidence degree in estimating the position of the host vehicle at the candidate passing position d based on the reference confidence degree at the candidate passing position d and the shielding influence degree at the candidate passing position d. As an example, the confidence degree calculation unit 16 can calculate the difference value obtained by subtracting the shielding influence degree from the reference confidence degree as the confidence degree in estimating the position of the host vehicle.

Figure 6:
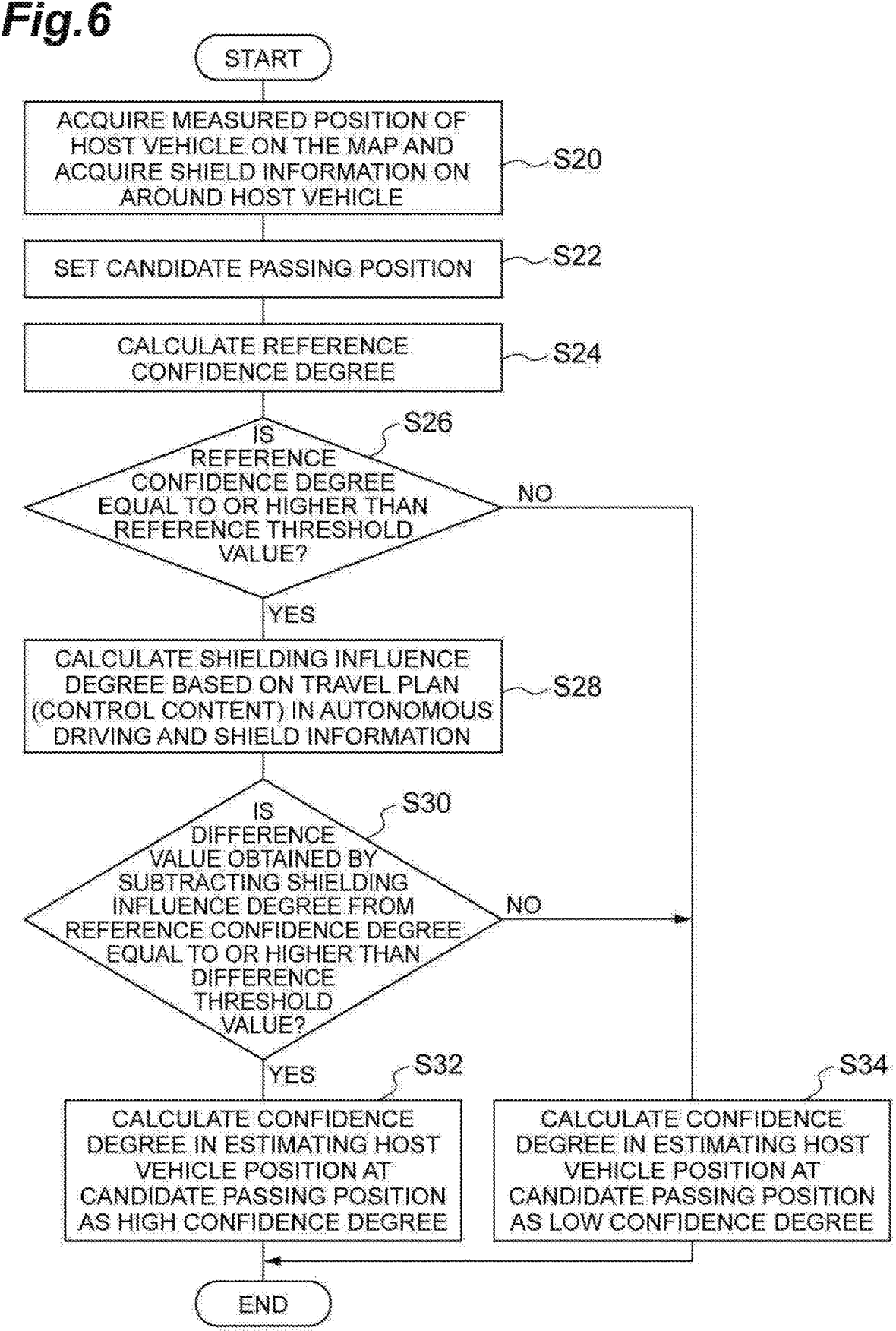
FIG. 6 is a flowchart illustrating another example of confidence degree calculation processing in the first embodiment.

Another example of Confidence Degree Calculation Processing by the Host Vehicle Position Confidence Degree Calculation Device in the First Embodiment Subsequently, another example of the confidence degree calculation processing by the host vehicle position confidence degree calculation device 100 will be described. FIG. 6 is a flowchart illustrating another example of the confidence degree calculation processing in the first embodiment. The processing in the flowchart illustrated in FIG. 6 is performed during the autonomous driving of the host vehicle M.

Since the processing items in S20 to S24 illustrated in FIG. 6 are the same as the processing items in S10 to S14 illustrated in FIG. 5, the description thereof will be omitted.

As illustrated in FIG. 6, in S26, the confidence degree calculation ECU 10 of the host vehicle position confidence degree calculation device 100 determines whether or not the reference confidence degree calculated by the reference confidence degree calculation unit 13 is equal to or higher than the reference threshold value. If it is determined that the reference confidence degree is equal to or higher than the reference threshold value (YES in S26), the confidence degree calculation ECU 10 moves the process to S28. If it is determined that the reference confidence degree is lower than the reference threshold value (NO in S26), the confidence degree calculation ECU 10 moves the process to S34.

In S28, the confidence degree calculation ECU 10 calculates the shielding influence degree at the candidate passing position d using the shielding influence degree calculation unit 15. The shielding influence degree calculation unit 15 calculates the shielding influence degree in estimating the position of the host vehicle at the candidate passing position d based on the travel plan in the autonomous driving (the control content) and the shield information. The shielding influence degree calculation unit 15 can calculate the shielding influence degree in estimating the position of the host vehicle at the candidate passing position d based on the travel plan in the autonomous driving and the shield information by predicting the situation of the shield such as other vehicles at the candidate passing position d (the relative position with respect to the host vehicle M)

In S30, the confidence degree calculation ECU 10 determines whether or not the difference value obtained by subtracting the shielding influence degree from the reference confidence degree is equal to or higher than the difference threshold value using the confidence degree calculation unit 16. If it is determined that the difference value obtained by subtracting the shielding influence degree from the reference confidence degree is equal to or higher than the difference threshold value (YES in S30), the confidence degree calculation ECU 10 moves the process to S32. If it is not determined that the difference value obtained by subtracting the shielding influence degree from the reference confidence degree is equal to or higher than the difference threshold value (NO in S30), the confidence degree calculation ECU 10 moves the process to S34.

In S32, the confidence degree calculation. ECU 10 calculates the confidence degree in estimating the position of the host vehicle at the candidate passing position d as the high confidence degree using the confidence degree calculation unit 16. On the other hand, in S34, the confidence degree calculation ECU 10 calculates the confidence degree in estimating the position of the host vehicle at the candidate passing position d as the low confidence degree using the confidence degree calculation unit 16.

The processing in the flowchart illustrated in FIG. 6 may be performed even when the host vehicle M is not performing the autonomous driving. In this case, in S28, the shielding influence degree calculation unit 15 calculates the shielding influence degree at the candidate passing position d using the shield information without using the travel plan in the autonomous driving. On the other hand, in S28 in FIG. 5, if the host vehicle M is performing the autonomous driving, the shielding influence degree calculation unit 15 may calculate the shielding influence degree at the candidate passing position d based on the travel plan in the autonomous driving and the shield information.

Operation Effects of the Host Vehicle Position Confidence Degree Calculation Device in the First Embodiment The host vehicle position confidence degree calculation device 100 in the first embodiment described above calculates the reference confidence degree at the candidate passing position based on the position information on the object on the map, and calculates the shielding influence degree at the candidate passing position based on the shield information. Therefore, according to the host vehicle position confidence degree calculation device 100, it is possible to appropriately obtain the confidence degree in estimating the position of the host vehicle based on the reference confidence degree while considering the arrangement of the objects at the candidate passing position and based on the shielding influence degree while considering the shields around the host vehicle.

In addition, if the host vehicle M is performing the autonomous driving, the host vehicle position confidence degree calculation device 100 calculates the shielding influence degree at the candidate passing position d based on the travel plan in the autonomous driving (the control content set in advance) and the shield information. Thus, in the host vehicle position confidence degree calculation device 100, even if the shield that interfere with the detection of the object by the vehicle-mounted sensor of the host vehicle is not present at the current time point, it can be assumed that the host vehicle may be surrounded by other vehicles at the candidate passing position depending on the control content of vehicle control. Therefore, by calculating the shielding influence degree based on the control content of vehicle control and shield information, it is possible to appropriately obtain the shielding influence degree at the candidate passing position.

In addition, in the host vehicle position confidence degree calculation device 100, by setting the candidate passing position on the target route based on the target route of the host vehicle set in advance, it is possible to appropriately obtain the confidence degree in estimating the position of the host vehicle at the candidate passing position on the target route of the host vehicle.

Second Embodiment

Hereinafter, a host vehicle position confidence degree calculation device in a second embodiment will be described with reference to the drawings. FIG. 7 is a block diagram illustrating the host vehicle position confidence degree calculation device in the second embodiment. A host vehicle position confidence degree calculation device 200 illustrated in FIG. 7 is different from the device in the first embodiment in a point that a road environment influence degree is used instead of the shielding influence degree.

Configuration of the Host Vehicle Position Confidence Degree Calculation Device in the Second Embodiment As illustrated in FIG. 7, a confidence degree calculation ECU 20 of the host vehicle position confidence degree calculation device 200 in the second embodiment includes a road environment information acquisition unit 21 and a road environment influence degree calculation unit 22. In addition, functions of a confidence degree calculation unit 23 are different from that of the confidence degree calculation unit 16 in the first embodiment.

The road environment information acquisition unit 21 acquires road environment information at the candidate passing position d from the wireless network via the communication unit 6. The road environment information is information relating to the traveling environment of the road such as traffic information. The road environment information includes the traffic information. The traffic information is information relating to the density of the vehicles associated with the section of the road or the position on the road. The traffic information is not particularly limited, and well-known information on the traffic jam can be used.

The road environment information may include road construction information. The road construction information is information relating to the road construction associated with the section of the road or the position on the road. The road construction information may include information relating to the time or period during which the road construction is performed. The road environment information may include weather information associated with the region, the section of the road, or a position on the road. The road environment information acquisition unit 21 may acquire the road environment information from other vehicles traveling on the candidate passing position d through vehicle-to-vehicle communication. If information on object deterioration such as rubbing of a lane line is acquired from the preceding vehicle by the vehicle-to-vehicle communication, the road environment information acquisition unit 21 may include the information on the object deterioration in the road environment information.

The road environment influence degree calculation unit 22 calculates the road environment influence degree in estimating the position of the host vehicle based on the road environment information at the candidate passing position d acquired by road environment information acquisition unit 21. The road environment influence degree means a degree of influence of the road environment in estimating the position of the host vehicle. That is, if a traffic jam occurs at the candidate passing position d, the detection of object is interfered by other vehicles or the like, and it is assumed that the confidence degree in estimating the position of the host vehicle is influenced.

For example, if it is recognized that the road environment at the candidate passing position d is in a jammed state based on the road environment information at the candidate passing position d, the road environment influence degree calculation unit 22 calculates the road environment influence degree at the candidate passing position d as a larger value compared to a case where it is not recognized that the road environment at the candidate passing position d is in the jammed state. The information whether or not the road environment is in the jammed state may be included in the road environment information in advance as the traffic information. If the density of the vehicles on the road at the candidate passing position d is equal to or higher than a congestion threshold value, the road environment influence degree calculation unit 22 may recognize that the candidate passing position d is in the jammed state. The jamming threshold value is a value set in advance. The density of the vehicles is, for example, the number of vehicles in a section of a fixed distance.

If it is recognized that the road environment at the candidate passing position d is in a congested state, the road environment influence degree calculation unit 22 calculates the road environment influence degree at the candidate passing position d as a higher value compared to a case where it is recognized that the road environment at the candidate passing position d is in an empty state. If the density of the vehicles on the road at the candidate passing position d is equal to or higher than a congestion threshold value and lower than the jamming threshold value, the road environment influence degree calculation unit 22 may recognize that the road environment at the candidate passing position d is in a congested state. The congestion threshold value is a value set in advance, which is lower than the jamming threshold value. If the density of the vehicles on the road at the candidate passing position d is lower than the congestion threshold value, the road environment influence degree calculation unit 22 may recognize that the road environment at the candidate passing position d is in the empty state.

If it recognized that the road construction is being performed at the candidate passing position d based on the road environment information at the candidate passing position d, the road environment influence degree calculation unit 22 may calculate the road environment influence degree at the candidate passing position d as a higher value compared to a case where the road construction is not performed at the candidate passing position d. If it is recognized that the weather at the candidate passing position d is rainy based on the road environment information at the candidate passing position d, the road environment influence degree calculation unit 22 may calculate the road environment influence degree at the candidate passing position d as a higher value compared to a case where it is recognized that the weather at the candidate passing position d is fine.

The confidence degree calculation unit 23 calculates the confidence degree in estimating the position of the host vehicle at the candidate passing position d based on the reference confidence degree at the candidate passing position d calculated by the reference confidence degree calculation unit 13 and the road environment influence degree at the candidate passing position d calculated by the road environment influence degree calculation unit 22.

As an example, the confidence degree calculation unit 23 can calculate the difference value obtained by subtracting the road environment influence degree from the reference confidence degree as the confidence degree in estimating the position of the host vehicle. The confidence degree calculation unit 23 may calculate a value obtained by multiplying the reference confidence degree by a road environment influence degree (or a weighting factor corresponding to the road environment influence degree) as a confidence degree in estimating the position of the host vehicle. In addition, the confidence degree calculation unit 23 can calculate the confidence degree in estimating the position of the host vehicle using a similar method in which shielding influence degree in the first embodiment is replaced by the road environment influence degree. In this case, the shielding threshold value in the first embodiment is replaced by a road environment threshold value set in advance.

Figure 8A:
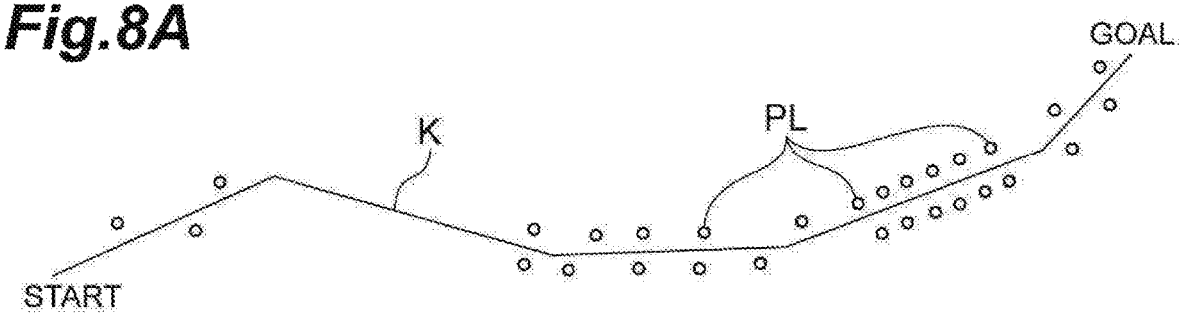
FIG. 8A is a diagram illustrating an arrangement state of an object along a target route of the host vehicle.

Here, the calculation of the confidence degree in estimating the position of the host vehicle in the second embodiment will be described with reference to FIGS. 8A to 8D. FIG. 8A is a diagram illustrating a situation of objects along a target route of the host vehicle M. In FIG. 8A, a target route K and objects PL are illustrated. On the target route K illustrated in FIG. 8A, for example, the candidate passing position d is set at a regular interval. The candidate passing position setting unit 12 sets a plurality of candidate passing position d on the target route K based on the target route K set in advance. FIG. 8A illustrates a situation in which the objects PL are present in a dispersed manner from the start (current position) of the target route K to the goal (destination).

Figure 8B:
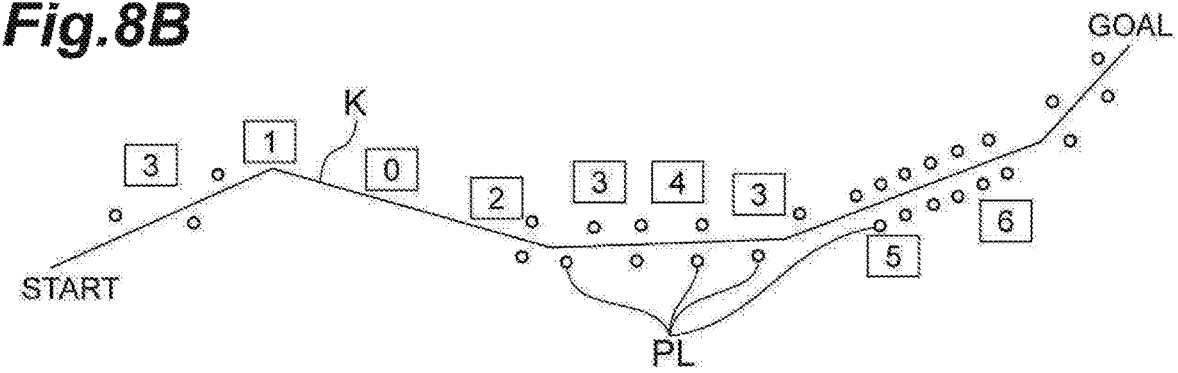
FIG. 8B is a diagram illustrating a result of calculation of a reference confidence degree along the target route.

FIG. 8B is a diagram illustrating a result of calculation of the reference confidence degrees along the target route K. FIG. 8B illustrates the reference confidence degrees calculated by the reference confidence degree calculation unit 13 as numerical values. The reference confidence degree calculation unit 13 calculates the reference confidence degree as a larger value as the number of objects increases based on the position information of the object on the map stored in the object database 5.

Figure 8C:
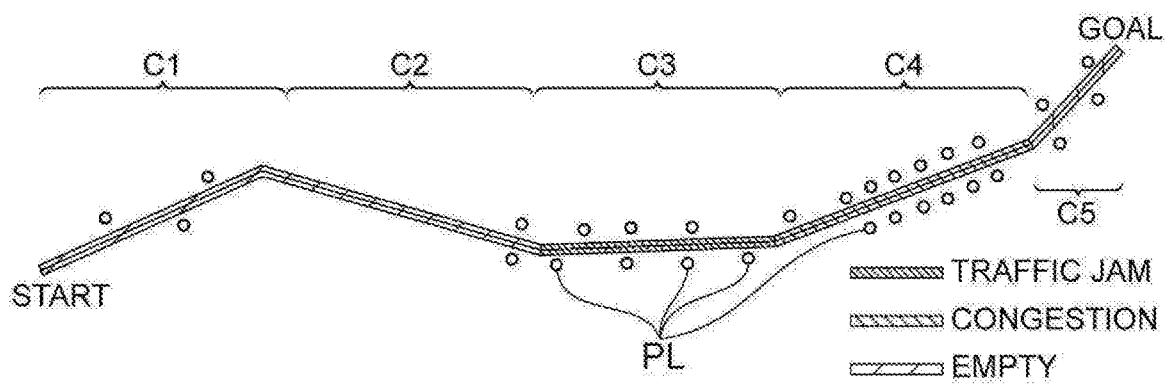
FIG. 8C is a diagram illustrating a road environment along a target route.

FIG. 8C is a diagram illustrating the road environment along the target route K. FIG. 8C illustrates sections C1 to C5 obtained by dividing the target route K. The section C1, section C2, and section C5 are sections where the road environments are in empty states. The section C3 is a section where the road environment is in a jammed state. The section C4 is a section where the road environment is in a congested state.

The road environment influence degree calculation unit 22 calculates the road environment influence degree at the candidate passing position d included in the sections C1, C2, and C5 where the road environment are in empty states, as a small value compared to the road environment influence degree at the candidate passing position d included in the section C4 where the road environment is in a congested state. The road environment influence degree calculation unit 22 calculates the road environment influence degree at the candidate passing position d included in the section C4 where the road environment is in a congested state as a small value compared to the road environment influence degree at the candidate passing position d included in section C3 where the road environment is in the jammed state.

Figure 8D:
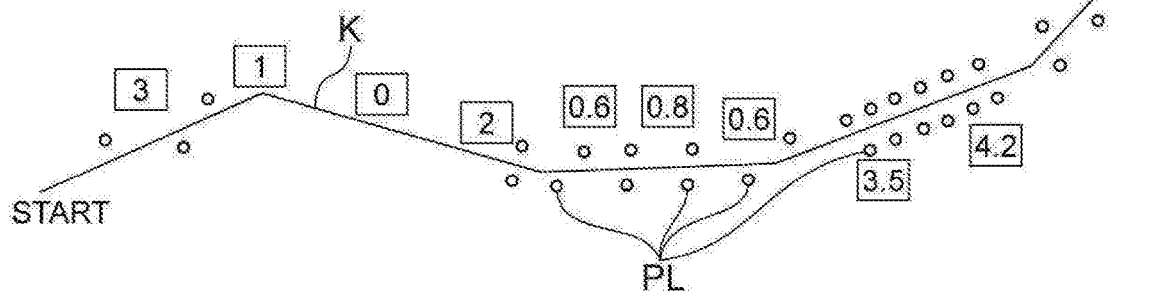
FIG. 8D is a diagram illustrating a result of calculation of the confidence degree along the target route.

FIG. 8D is a diagram illustrating a result of calculation of the confidence degrees along the target route K. FIG. 8D illustrates the confidence degrees in estimating the position of the host vehicle for each candidate passing position d calculated by the confidence degree calculation unit 23 as numerical values. Here, the confidence degree calculation unit 23 calculates the confidence degree in estimating the position of the host vehicle as a value obtained by multiplying the reference confidence degree by the road environment influence degree. As described above, the host vehicle position confidence degree calculation device 200 in the second embodiment calculates the confidence degree in estimating the position of the host vehicle at each candidate passing position d while considering the reference confidence degree and the road environment influence degree calculated from the position information on the objects. The confidence degree calculation unit 23 may display the result of calculation of the confidence degrees along the target route K as illustrated in FIG. 8D to the driver via the HMI 7 according to the driver's request.

Figure 9:
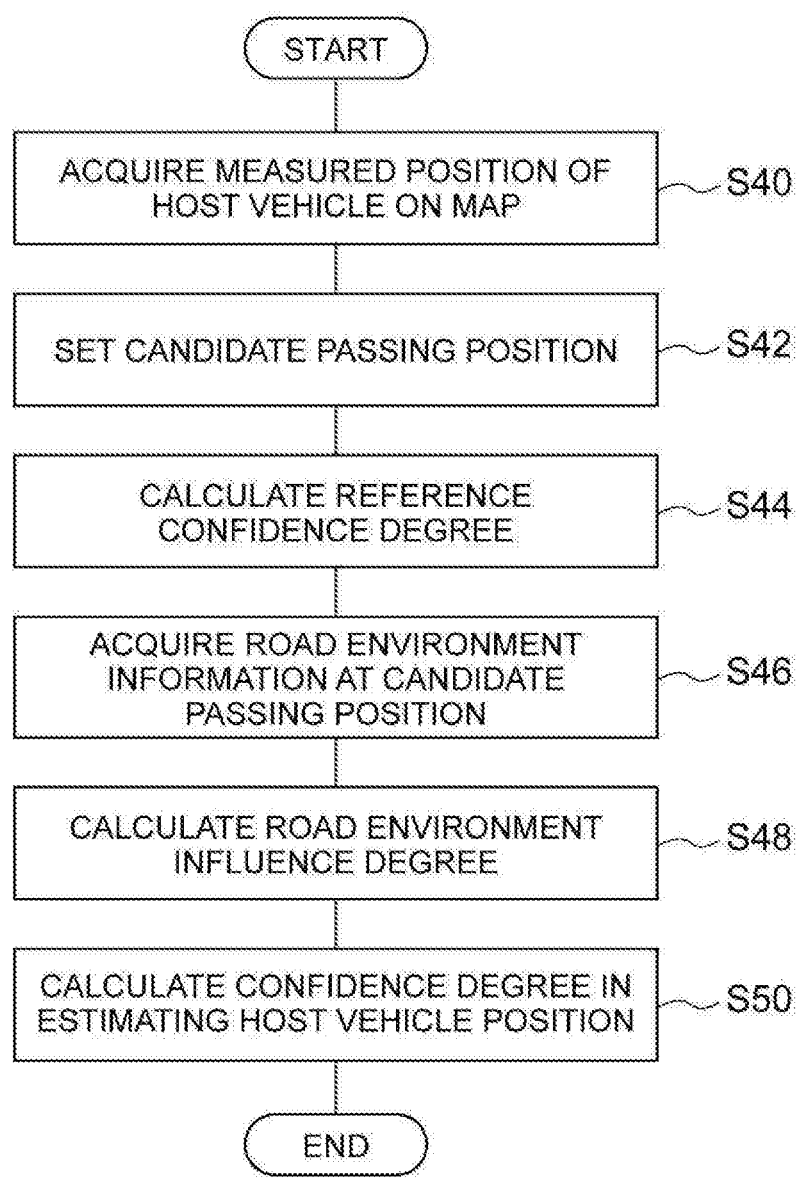
FIG. 9 is a flowchart illustrating an example of confidence degree. calculation processing in the second embodiment.

Confidence Degree Calculation Processing by the Host Vehicle Position Confidence Degree Calculation Device in the Second Embodiment Subsequently, the confidence degree calculation processing by the host vehicle position confidence degree calculation device 200 in the second embodiment will be described with reference to FIG. 9. FIG. 9 is a flowchart illustrating an example of confidence degree calculation processing in the second embodiment. The processing in the flowchart illustrated in FIG. 9 is performed when an engine of the host vehicle M is started and enabled to travel.

Since the processing items in S40 to S44 illustrated in FIG. 9 are the same as the processing items in S10 to S14 illustrated in FIG. 5, the description thereof will be omitted.

As illustrated in FIG. 9, in S46, the confidence degree calculation ECU 20 of the host vehicle position confidence degree calculation device 200 acquires the road environment information using the road environment information acquisition unit 21. The road environment information acquisition unit 21 acquires the road environment information at the candidate passing position d from the wireless network via the communication unit 6.

In S48, the confidence degree calculation ECU 20 calculates the road environment influence degree at the candidate passing position d using the road environment influence degree calculation unit 22. The road environment influence degree calculation unit 22 calculates the road environment influence degree in estimating the position of the host vehicle based on the road environment information at the candidate passing position d acquired by the road environment infoiivation acquisition unit 21.

In S 50, the confidence degree calculation ECU 20 calculates the confidence degree in estimating the position of the host vehicle at the candidate passing position d using the confidence degree calculation unit 23. The confidence degree calculation unit 23 calculates the confidence degree in estimating the position of the host vehicle in the candidate passing position d based on the reference confidence degree at the candidate passing position d calculated by the reference confidence degree calculation unit 13 and the road environment influence degree at the candidate passing position d calculated by the road environment influence degree calculation unit 22. As an example, the confidence degree calculation unit 23 calculates the difference value obtained by subtracting the road environment influence degree from the reference confidence degree as the confidence degree in estimating the position of the host vehicle.

Operation Effects of the Host Vehicle Position Confidence Degree Calculation Device in the Second. Embodiment The host vehicle position confidence degree calculation device 200 in the second embodiment described above calculates the reference confidence degree at the candidate passing position based on the position information on the object on the map, and calculates the road environment influence degree based on the road environment information. Therefore, according to the host vehicle position confidence degree calculation device 200, it is possible to appropriately obtain the confidence degree in estimating the position of the host vehicle based on the reference confidence degree while considering the arrangement of the objects at the candidate passing position and based on the road environment influence degree while considering the road environment information such as the traffic jam that interferes with the detection.

As described above, the preferred embodiments of the present disclosure have been described, however, the present disclosure is not limited to the above-described embodiments. The present invention can be implemented in various forms including various modifications and improvements based on the knowledge of those skilled in the art, including the above-described embodiments.

For example, in the host vehicle position confidence degree calculation device 100 in the first embodiment, the road environment influence degree in the second embodiment may be taken into consideration. In this case, the confidence degree calculation ECU 10 of the host vehicle position confidence degree calculation device 100 includes the road environment information acquisition unit 21 and the road environment influence degree calculation unit 22 in the second embodiment. The confidence degree calculation unit 16 of the confidence degree calculation ECU 10 calculates the confidence degree in estimating the position of the host vehicle at the candidate passing position d based on the reference confidence degree, the shielding influence degree, and the road environment influence degree.

The confidence degree calculation unit 16 may calculate the confidence degree in estimating the position of the host vehicle from the reference confidence degree, the shielding influence degree, and the road environment influence degree using a calculation formula set in advance. The confidence degree calculation unit 16 may calculate the confidence degree in estimating the position of the host vehicle using table data in which the reference confidence degree, the shielding influence degree, the road environment influence degree, and the confidence degree in estimating the position of the host vehicle are associated with each other in advance.

As an example, the confidence degree calculation unit 16 can calculate the difference value obtained by subtracting the shielding influence degree and the road environment influence degree from the reference confidence degree as the confidence degree in estimating the position of the host vehicle. The confidence degree calculation unit 16 calculates the value obtained by multiplying the reference confidence degree by the shielding influence degree and the road environment influence degree (or the weighting coefficient according to the shielding influence degree and the road environment influence degree) as the confidence degree in estimating the position of the host vehicle.

If the shielding influence degrees and the road environment influence degrees are the same respectively, the confidence degree calculation unit 16 may set the confidence degree in estimating the position of the host vehicle to be a higher value when the reference confidence degree is equal to or higher than the reference threshold value compared to a case when the reference confidence degree is lower than the reference threshold value. The confidence degree calculation unit 16 may change the confidence degree in estimating the position of the host vehicle step by step by providing a plurality of reference threshold values.

If the reference confidence degrees and the road environment influence degrees are the same respectively, the confidence degree calculation unit 16 may set the confidence degree in estimating the position of the host vehicle to be a lower value when the shielding influence degree is equal to or higher than a shielding threshold value compared to a case when the shielding influence degree is lower than the shielding threshold value. The shielding threshold value is a value set in advance. The confidence degree calculation unit 16 may change the confidence degree in estimating the position of the host vehicle step by step by providing a plurality of shielding threshold values.

If the reference confidence degrees and the shielding influence degrees are the same respectively, the confidence degree calculation unit 16 may set the confidence degree in estimating the position of the host vehicle to be a lower value when the road environment influence degree is equal to or higher than a road environment threshold value compared to a case when the road environment influence degree is lower than the road environment threshold value. The road environment threshold value is a value set in advance. The shielding threshold value is a value set in advance. The confidence degree calculation unit 16 may change the confidence degree in estimating the position of the host vehicle step by step by providing a plurality of road environment threshold values.

If the shielding influence degrees and the road environment influence degrees are the same respectively, the confidence degree calculation unit 16 may continuously set the confidence degree in estimating the position of the host vehicle as a higher value as the reference confidence degree increases. If the reference confidence degrees and the road environment influence degrees are the same respectively, the confidence degree calculation unit 16 may continuously set the confidence degree in estimating the position of the host vehicle as a lower value as the shielding influence degree increases. If the reference confidence degrees and the shielding influence degrees are the same respectively, the confidence degree calculation unit 16 may continuously set the confidence degree in estimating the position of the host vehicle as a lower value as the road environment influence degree increases.

Since it can be considered that the influence of the shielding influence degree by the shield around the current host vehicle M decreases as the distance between the measured position of the host vehicle M and the candidate passing position d increases, the shielding influence degree calculation unit 15 may calculate the shielding influence degree according to the distance between the measured position of the host vehicle M and the candidate passing position d. If the distance between the measured position of the host vehicle M and the candidate passing position d is longer than an influence determination threshold value, the shielding influence degree calculation unit 15 may calculate the shielding influence degree as a lower value compared to a case where the distance between the measured position of the host vehicle M and the candidate passing position d is shorter than the influence determination threshold value. The shielding influence degree calculation unit 15 may continuously set the shielding influence degree as a small value as the distance between the measured position of the host vehicle M and the candidate passing position d increases.

According to the host vehicle position confidence degree calculation device 100 in this case, by calculating the confidence degree in estimating the position of the host vehicle based on the road environment influence degree while considering the road environment information such as the traffic jam that interferes with the detection of the object in addition to the reference confidence degree and the shielding influence degree, it is possible to appropriately obtain the confidence degree in estimating the position of the host vehicle at the candidate passing position.

In addition, the host vehicle position confidence degree calculation devices 100 and 200 are not necessarily mounted on the vehicle, but may be provided in a server in an information management center or the like. In this case, the host vehicle position confidence degree calculation devices 100 and 200 can calculate the confidence degree in estimating the position of the host vehicle at the candidate passing position d, for example, by receiving a request for the calculation of the confidence degree from the host vehicle M and various information on the host vehicle M (result of detection performed by the external sensor or the target route).

The candidate passing position d may be a position where the vehicle traveled for a certain period of time from the measured position of the host vehicle in the traveling lane of the host vehicle M. In this case, the candidate passing position setting unit 12 sets the candidate passing position based on the measured position of the host vehicle M, the map information, and the vehicle speed information from the internal sensor 3.

In addition, the host vehicle position confidence degree calculation device 100 does not necessarily need to set the candidate passing position, but the candidate passing position may be set in advance by another device or the like. In this case, the host vehicle position confidence degree calculation device 100 may not include the measured position acquisition unit 11 and/or the candidate passing position setting unit 12. In this case, the processing items in S10 and S12 in FIGS. 5, S20 and S22 in FIG. 6, and S40 and S42 in FIG. 9 can be omitted.

The host vehicle M does not necessarily need to include the autonomous driving ECU 50. If the host vehicle M is performing the vehicle control according to the control content set in advance, the shielding influence degree calculation unit 15 can calculate the shielding influence degree in estimating the position of the host vehicle at the candidate passing position d based on the control content and the shield information. The driving support control such as an adaptive cruise control (ACC) is included in the vehicle control according to the control content set in advance when the autonomous driving ECU 50 is not provided. The ACC is a control that performs a follow-up control in which, for example, a constant speed control is performed to cause the vehicle to travel at a constant speed set in advance when a preceding vehicle is not present in front of the vehicle, and the vehicle speed is adjusted according to a vehicle-to-vehicle distance with the preceding vehicle when the preceding vehicle is present in front of the vehicle.

What is claimed is:

1. A host vehicle position confidence degree calculation device comprising:

a memory that stores position information of one or more real world objects in map; and a processor configured to:
  calculate a reference confidence degree of an estimated position of a host vehicle at a candidate passing position of the host vehicle that is based on the position information of the one or more real world objects in the map;
  acquire shield information on a shield around the host vehicle based on a result of detection performed by a vehicle-mounted sensor of the host vehicle;
  calculate a shielding influence degree at the candidate passing position based on the shield information; and
  calculate a confidence degree of the estimated position of the host vehicle at the candidate passing position based on the reference confidence degree and the shielding influence degree.

2. The host vehicle position confidence degree calculation device according to claim 1, wherein the processor is further configured to calculate the shielding influence degree based on a control content set in advance and the shield information if the host vehicle is performing a vehicle control according to the control content.

3. The host vehicle position confidence degree calculation device according to claim 2, wherein the processor is further configured to:
  acquire road environment information at the candidate passing position;
  calculate a road environment influence degree at the candidate passing position based on the road environment information; and
  calculate the confidence degree of the estimated position of the host vehicle at the candidate passing position based on the reference confidence degree, the shielding influence degree, and the road environment influence degree.

4. The host vehicle position confidence degree calculation device according to claim 3, wherein the processor is further configured to: set the candidate passing position on a target route of the host vehicle.

5. The host vehicle position confidence degree calculation device according to claim 3, wherein the road environment information includes one or more of: traffic information, road construction information, weather information, or object deterioration information.

6. The host vehicle position confidence degree calculation device according to claim 2, wherein the processor is further configured to: set the candidate passing position on a target route of the host vehicle.

7. The host vehicle position confidence degree calculation device according to claim 1, wherein the processor is further configured to:
  acquire road environment information at the candidate passing position;
  calculate a road environment influence degree at the candidate passing position based on the road environment information;
  calculate the confidence degree of the estimated position of the host vehicle at the candidate passing position based on the reference confidence degree, the shielding influence degree, and the road environment influence degree.

8. The host vehicle position confidence degree calculation device according to claim 7, wherein the processor is further configured to: set the candidate passing position on a target route of the host vehicle.

9. The host vehicle position confidence degree calculation device according to claim 7, wherein the road environment information includes one or more of: traffic information, road construction information, weather information, or object deterioration information.

10. The host vehicle position confidence degree calculation device according to claim 1, wherein the processor is further configured to: set the candidate passing position on a target route of the host vehicle.

11. A host vehicle position confidence degree calculation device comprising:
  a memory that stores position information of one or more real world objects in a map; and
  a processor configured to:
    calculate a reference confidence degree of an estimated position of a host vehicle at a candidate passing position of the host vehicle based on the position information of the one or more real world objects in the map;
    acquire road environment information at the candidate passing position, wherein the road environment information includes one or more of: traffic information, road construction information, weather information, or object deterioration information;
    calculate a road environment influence degree at the candidate passing position based on the road environment information; and
    calculate a confidence degree of the estimated position of the host vehicle at the candidate passing position based on the reference confidence degree and the road environment influence degree.

12. The host vehicle position confidence degree calculation device according to claim 11, wherein the processor is further configured to: set the candidate passing position on a target route of the host vehicle.

13. The host vehicle position confidence degree calculation device according to claim 11, wherein the processor is further configured to: acquire an actual measured position of the host vehicle on the map based on actual measured position information of the host vehicle measured by a global positioning system (GPS) receiver.

14. The host vehicle position confidence degree calculation device according to claim 11, wherein the processor is further configured to: calculate the reference confidence degree of the estimated position of the host vehicle at the candidate passing position of the host vehicle based on a number of the one or more real world objects included in a sensor detection range of the host vehicle when the host vehicle reaches the candidate passing position.

* * * * *